July 3, 1962 O. E. EISSMANN ETAL 3,042,454

ARTICLE CONVEYING MECHANISM

Filed Oct. 30, 1959 2 Sheets-Sheet 1

*INVENTORS*
OSWALD ERICH EISSMANN
HANS G. KROHNE
BY

ATTORNEY

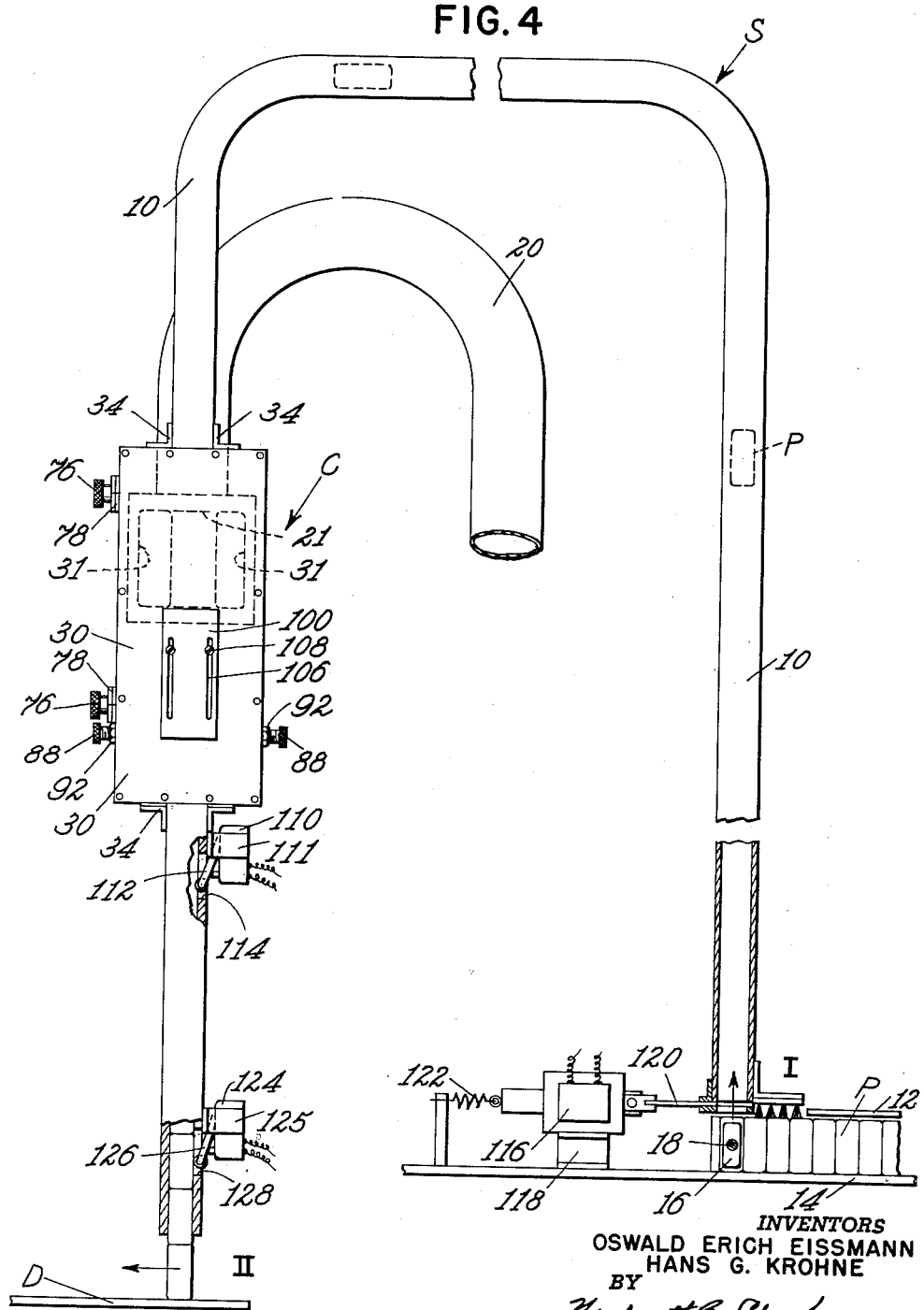

United States Patent Office 3,042,454
Patented July 3, 1962

3,042,454
ARTICLE CONVEYING MECHANISM
Oswald E. Eissmann and Hans G. Krohne, Richmond, Va., assignors to American Machine & Foundry Company, a corporation of New Jersey
Filed Oct. 30, 1959, Ser. No. 849,863
19 Claims. (Cl. 302—2)

The present invention relates to improvements in article handling mechanisms and more particularly in apparatus for conveying cigarette packages from one or more packaging devices to a cartoning device.

According to the present invention, cigarette packages are conveyed pneumatically from a delivery station; such as, the exit end of a packaging machine to a discharge station; such as, the entrance section of a cartoning machine. Cigarette packages at the delivery station are blown or sucked through connecting tubing to a delivery chute adjacent the discharge station. The delivery chute is provided to insure effective control of the packages as they are positively discharged from the conveying device. Packages conveyed to the delivery chute are engaged by a pair of travelling, opposed, perforated belts. Each belt is mounted for travel along a slotted elongated guide plate adjustably spaced from each other sufficiently to allow cigarette packages to be received therebetween. The belts are perforated and the plates are slotted adjacent the upper portion thereof so that when suction is created between the plates the necessary conveying of the articles can be effected. At the entrance end of the delivery chute, the belts and guide plates form a slightly tapered entry for packages, thus insuring positive, undamaging engagement between packages and belts. Packages engaged by the belts are travelled past the suction mechanism to the discharge station for release to the cartoning mechanism.

The sides of the chute formed by the belts and plates are closed by an adjustable wall, a coacting guide plate, and a pivoted gravity biased gate. The plates and wall are adjustably mounted to permit accommodation for cigarette packs of varying widths and thicknesses. The gate is operative after a pack has been moved therepast by the belts to swing upwardly cutting off the suction in the lower part of the delivery device as soon as a package has been cleared therethrough, preventing any packages from being sucked back into the delivery chute or being held in the discharge end of the conveying device by negative pressure.

It is therefore an object of the present invention to provide a novel article handling device utilizing pneumatic pressure and opposed travelling conveyors for conveying articles from a delivery station to a discharge station.

Another object of the present invention is to provide a conveying device for conveying articles from a delivery station to a discharge station utilizing suction means and a pair of opposed guide plates and travelling belts for engaging the discharge station and positively urging the articles out of the conveying system.

A further object of the present invention is to provide a conveying system for delivering packages from a delivery station to a discharge station utilizing suction means and a pair of opposed slotted guide plates and perforated travelling belts for engaging the packs adjacent the discharge station and positively urging the packages out of the conveying system and means for eliminating the suction force after a package has been urged out of the conveying system to ensure a continuous delivery of packages from the system.

It is likewise an object of this invention to provide, in a pneumatic conveying system for transferring articles from a delivery chute including a pair of opposed adjustable slotted guide plates, perforated travelling belts mounted for travel over the guide plates, the guide plates and belts forming a slightly tapered entry for packages into the chute, the belts being operative to engage and deliver articles out of the chute and a pivoted gravity biased gate to close the discharge end of the chute ensuring uninterrupted flow of articles through the system.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

FIG. 4 is a front elevation of a conveying system embodying a preferred form of the present invention.

Figure 1:
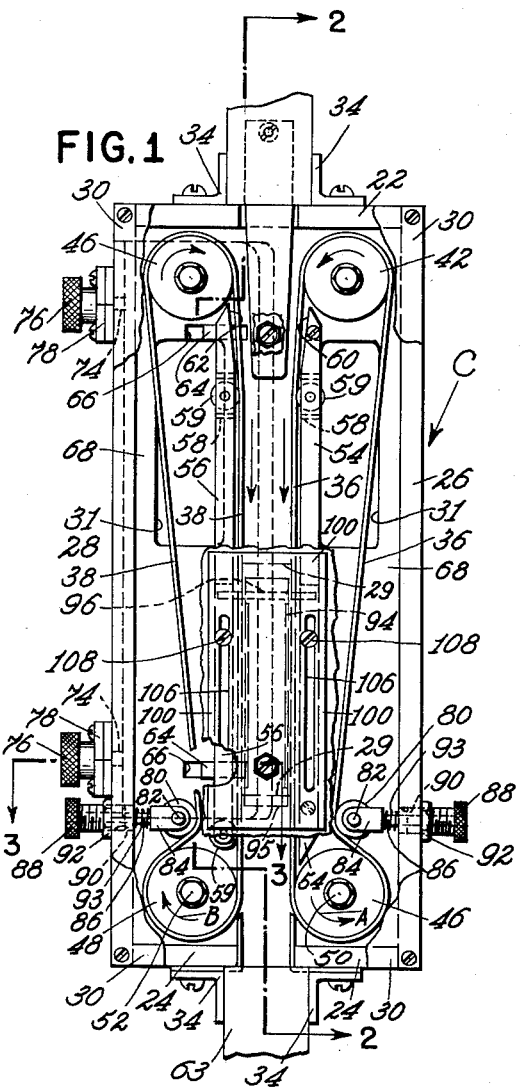
FIG. 1 is a front elevation partly in section of a package delivery chute embodying a preferred form of the present invention.

Referring to the drawings, and especially FIGURE 4, there is illustrated a conveying system S embodying a preferred form of the present invention. System S includes an entrance station I and a discharge station II remote therefrom, stations I and II being operatively connected by tubing 10. Tubing 10 is preferably rectangular in cross-section to accommodate a cigarette package P therein, but may be of any desired cross-section without adversely affecting the operation of system S.

Packages P are delivered to station I from a suitable source of supply; such as, a packaging machine (not shown) to a suitable delivery device at station II; such as a cartoning machine (not shown). At station I, packages P are delivered between guide plates 12 and 14 into the range of plunger 16. Plunger 16 operated through reciprocating connecting rod 18 by any suitable drive means (not shown) moves a package P into position at station I.

To convey packages P from station I to station II there is provided a suction section 20 of a suitable exhaust fan (not shown) operatively associated with tubing 10. In operation packages P positioned at station I by plunger 16 are conducted by the suction generated in tubing 10 by section 20 to a position adjacent station II and into a delivery chute, designated generally C.

Figure 2:
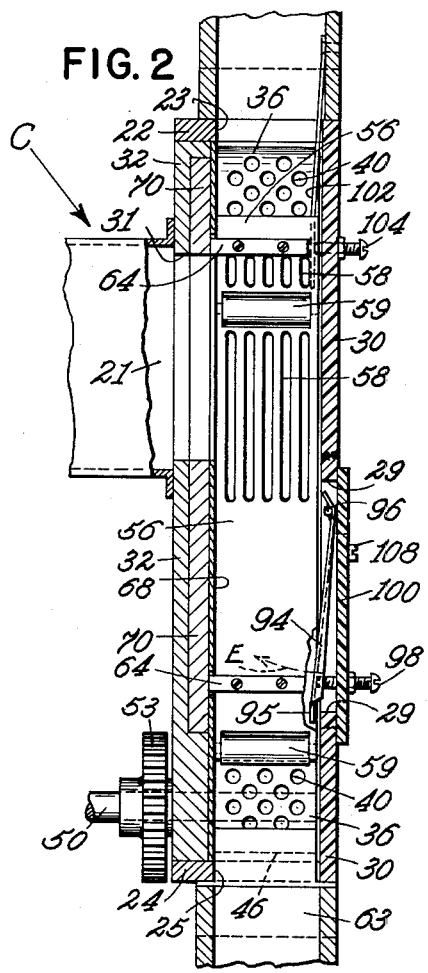
FIG. 2 is a sectional side elevation taken along line 2—2 of FIG. 1.

Referring to FIGURES 1 and 2, chute C comprises top, bottom, two side, front and rear frame members designated 22, 24, 26, 28, 30 and 32 respectively. As shown in FIGURE 2, it will be noted that, in the preferred embodiment frame member 30 is constructed of plastic material preferably transparent to provide visual inspection of chute C, while the other frame members are generally of metal construction. However, if desired, any or all of the frame members may be of transparent plastic to permit visual inspection of all portions of chute C. Top and bottom frame members 22 and 24 are secured by brackets 34 to tubing 10 adjacent station II. Top frame member 22 is provided with an opening 23, preferably co-extensive with the opening of tube 10 permitting ingress of packages P from tubing 10 from station I into chute C. Likewise, bottom member 24 is provided with an opening 25 co-extensive with the opening in tube 10 to permit egress of packages P from chute C to station II in tubing 10.

Chute C includes a pair of opposed travelling conveyor belts 36 and 38, each provided with perforations 40 therein. Belt 36 describes a path of travel over idler pulley 42 and drive pulley 44, while belt 38 describes a path of travel over idler pulley 46 and drive pulley 48.

Drive pulleys 46 and 48 are mounted on shafts 50 and 52, respectively. Shaft 50 is provided with a drive gear 53, meshing with a suitable gear (not shown) on shaft 52, and driven from a suitable power source (not shown) to rotate shafts 50 and 52 in common in the direction of arrows A and B, FIGURE 1, travelling the opposed laps of belts 36 and 38 in a direction from top frame member 22 toward bottom member 24.

The opposed laps of belts 36 and 38 pass over plates 54 and 56 respectively, extending substantially the entire length of opposed travel of belts 36 and 38. Each plate 54 and 56 is provided with elongated slots or openings 58 in the upper half thereof. Each plate 54 and 56 is provided with one or more freely mounted rollers 59 therein to provide frictionless supports for belts 36 and 38 as they pass over plates 54 and 56.

Referring to FIGURES 1 and 2, rear frame member 32 is provided with two elongated openings 31 which accommodate the entry section 21 of suction section 20 into chute C. Each opening 31, which admit suction into chute C and system S, is on an opposite side of chute C and is generally aligned with slots 58 in one of the plates 54 and 56 between the laps of each belt 36 and 38.

Packages P sucked through tubing 10 and delivered into chute C are engaged between belts 36 and 38 and retained therebetween by the suction force acting thereon through plate slots 58 and belt perforations 40. To insure positive engagement of belts 36 and 38, without damage to the packages, plates 54 and 56 are provided with beveled sections 60 and 62 respectively, thus forming with belts 36 and 38 a slightly tapered neck at the entrance end of chute C. Packages P engaged by belts 36 and 38 are travelled thereby the entire length of chute C, past suction entry openings 31 to the delivery end of chute C and into outlet section 63 of tubing 10, for eventual delivery to station II.

Figure 3:
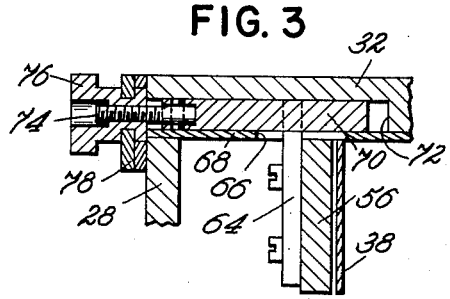
FIG. 3 is a view taken along line 3—3 of FIG. 1.

To accommodate packages P of different thicknesses, plate 56 is adjustably mounted for movement relative to plate 54. Plate 56 is mounted adjacent its upper and lower extremities to one end of transverse brackets 64. Brackets 64 are received in slots 66 in a back plate 68. Brackets 64 are secured at their free ends to a second plate 70, mounted in an elongated opening 72 formed in rear chute frame member 32. To move plate 70 back and forth in opening 72, thus moving brackets 64 in slots 66, plate 70 is provided with a pair of spaced threaded shafts 74 secured at one end thereto. The other end of each shaft 74, is threaded for travel in an associated actuating handle 76 mounted in a hub 78 on side chute frame member 28 and rear member 32 (see FIGURE 3). By turning handles 76, plate 70 is moved back or forth in opening 72, thereby moving plate 56 and its associated belt 38 back or forth relative to plate 54 and its associated belt 36, accommodating packages of different thicknesses.

To maintain the desired tension in each belt 36 and 38, there is provided for each a tension roller 80, freely mounted on a stud shaft 82, carried in a yoke 84. Each yoke 84 is provided with a pair of rods 86 (only one of which is shown) mounted thereon and extending therefrom. Each rod 86 in turn has its free end slidably mounted in an associated handle 88. Each handle 88 is threaded for travel in a threaded opening 90 in its associated side frame member 26 or 28 and maintained therein by a lock nut 92. Encircling each rod 86 is a compression spring 93 having one end thereof against yoke 84 and its other end against the bottom of handle 88. When handle 88 is turned, travelling further into its associated side frame member 26 or 28, the movement thereof increases the compression of its associated spring 93. This increase in compression in spring 93 is transmitted to yoke 84 and tends to slide its associated rod 86 out of handle 88 and toward belt 36 or 38, increasing the tension therein through roller 80. To decrease the tension in belt 36 or 38, its associated handle 88 is turned to travel out of its associated side frame member 26 or 28, decreasing the tension in spring 93 which is operative to effect the sliding movement of rod 86 into handle 88 and away from belt 36 or 38, decreasing the tension therein from roller 80. It will be understood that a pair of rods 86 and handles 88 are utilized to insure that their associated roller 80 is maintained parallel to side frame members 26 and 28 insuring uniform tension over the entire belt width.

In suction conveying systems heretofore available, packages discharged therefrom were subject to being sucked back into the system by air entering through the system outlet or, at the minimum, the flow of packages was disrupted by a package failing to discharge properly because of negative pressure in the outlet section. To overcome this problem and ensure a smooth, continuous discharge of packages P from system S, chute C is provided with a gate 94 pivotally mounted in an opening 29 in front frame member 30. Gate 94 is loosely mounted on a shaft 96 secured transversely of opening 29 in member 30. Gate 94 is thus mounted for gravity bias against member 30 with shaft 96 positioned below the lower end of slots 58.

In normal operation with packages P being conveyed by belts 36 and 38 through chute C, gate 94 occupies the open position shown in FIGURE 2, permitting unhindered passage of packages P therepast. In the event, however, that packages P stop entering system S for any reason or the passage of packages P through chute C temporarily interrupted, the suction force entering chute C through entries 31 is operative to pivot gate 94 about shaft 96 in the direction of arrow E, FIGURE 2, such that the lower free extremity or nose 95 of gate 94 bears against back plate 68. In this closed position, gate 94 effectively cuts off the suction force from the lower portion of chute C and the outlet section 63 of tubing 10, preventing reentry into chute C of packages discharged through chute C and into section 63 or the retention of packages P in outlet section 63 by negative pressure.

In addition, to prevent gate 94 from jamming against member 30 and to always be in condition to swing into closed position to cut off the suction force, gate 94 is maintained with nose 95 thereof extending into position between belts 36 and 38. To accomplish this, a set screw 98 is threaded for travel in cover plate 100 which closes opening 29 in member 30. Set screw 98 has one end thereof bearing against the back of gate 94 at nose 95. Set screw 98 can thus be actuated to travel into chute C and urge nose 95 into position between belts 36 and 38.

To properly position packages P in chute C to prevent damage thereto by nose 95 of gate 94 as the package is moved therepast by belts 36 and 38, there is provided an adjustable guide plate 102. The upper end of guide plate 102 is secured to the inner surface of tubing 10 adjacent member 30 at the top of chute C. Plate 102 is dimensioned to extend through opening 23 in top member 22 with the free end thereof positioned against the inner surface of member 30 as shown in FIGURES 1 and 2. A set screw 104 is provided in member 30 adjacent the top thereof with the free end of set screw 104 bearing against the back face of guide plate 102. Set screw 104 can be actuated for travel in member 30 into and out of chute C, urging the free end of guide plate 102 toward back plate 68 or permitting plate 102 to rest against member 30.

Thus, by actuating set screws 98 and 104, chute C can be adapted for packages of varying widths.

To further insure continuous uninterrupted discharge of packages P through chute C, cover plate 100 is provided with slots 106 which accommodate mounting screws 108 securing plate 100 to front frame member 30. By loosening screws 108, cover plate 100 may be slid upwardly or downwardly to completely close opening 29 or to provide an uncovered portion of opening 29 adjacent the bottom thereof. It has been found that by providing an uncovered portion of opening 29 adjacent the bottom thereof, any suction leaking past gate 94 when it is in its closed position, by-passes the package through opening 29 to such an extent as to prevent packages delivered by belts 36 and 38 into outlet section 63 from being held therein by negative pressure.

To likewise assist in eliminating this negative pressure, outlet section 63 may if desired, be provided with perforations (not shown), which aid cover plate 100 and gate 94 in insuring the continuous free flow of packages P to station II.

In the event that packages P are accumulated at station II, which could occur when the operation of the cartoning machine to which packages P are conveyed from station II is interrupted for any reason, control mechanism is provided for interrupting the flow of packages P into system S at station I. This control mechanism includes a normally-open switch 110 which is mounted on bracket 111 on outlet section 63 of tubing 10, with the operating arm 112 of switch 110 extending into tubing 10 through an opening 114. Switch 110 may be mounted on tubing 10 at any height above station II. It has been found that a height corresponding to the height of eight cigarette packages is generally desirable. Switch 110 is operatively connected to a suitable solenoid 116 mounted on bracket 118 adjacent station I. When packages P are accumulated at station II of a sufficient height to urge arm 112 out of opening 114, switch 110 is closed, completing a circuit energizing solenoid 116. Solenoid 116, when energized, urges its operating arm 120 into tubing 10 at station I, blocking the entry of packages P into system S. When the cartoning machine again resumes operation and the height of packages P at station II decreases below the level of switch 110, arm 112 thereof is free to return to position inside tubing 10, thus reopening switch 110. This interrupts the circuit energizing solenoid 116 permitting spring 122 to urge arm 120, secured thereto, out of blocking position in tubing 10, permitting re-entry of packages P into system S.

Often, it is necessary to maintain a minimum number of packages P at station II to insure that the cartoning machine will be provided with the proper number of packages for cartoning. To accomplish this, a second control system is included in outlet 63. This control system includes a second switch 124 mounted on a bracket 125 on outlet section 63 with the operating arm 126 extending into tubing 10 through an opening 128. Switch 124 may be mounted on tubing 10 at any height above station II dictated by the requirements of the associated cartoning machine. Switch 124 is then operatively connected to the control system (not shown) of the cartoning machine or, if desired, to the control system of delivery conveyor D to effectively interrupt the operation thereof until the minimum number of packages has been accumulated at station II to insure proper cartoning operation.

It will be understood that, if desired, chute C could be positioned adjacent station II to discharge packages P directly onto conveyor D, eliminating outlet section 63 and switches 110 and 124. Likewise, while, in FIGURE 4, chute C is positioned in system S to travel packages P in a vertical direction downwardly toward station II, if desired, chute C could be positioned in system S to travel packages P horizontally toward station II without adversely affecting the operation thereof.

Thus there is disclosed an efficient, simple system for conveying packages from a delivery station to a discharge station with mechanism for insuring continuous, uninterrupted and safe delivery of the articles handled.

What we claim is:

1. In an article conveying system for transferring articles from a delivery station to a discharge station remote therefrom, guide means defining the path of travel of articles from said delivery station to said discharge station, means operatively associated with said guide means for effecting the transfer therein of articles from said delivery station to said discharge station, means adjacent said discharge station for positively engaging said articles and conveying them for a portion of their travel to said discharge station, means to separate said articles from the action of said transfer means on said articles as said articles are conveyed by said conveying means whereby the continuous uninterrupted flow of articles is maintained, and means for preventing retrograde movement of said articles separated from the action of said transfer means.

2. The invention as defined in claim 1 wherein said transfer means is pneumatic and said means for positively engaging said articles includes a pair of spaced, opposed, travelling conveyors.

3. The invention as defined in claim 2 wherein said means for preventing retrograde movement of articles includes a gate, and means mounting said gate for movement therebetween to interrupt the pneumatic pressure acting on articles conveyed by said conveyors.

4. In an article conveying system for transferring articles from a delivery station to a discharge station remote therefrom, guide means defining the path of travel of articles from said delivery station to said discharge station, a delivery chute adjacent said discharge station and operatively connected to said guide means, suction means for effecting the transfer of articles from said delivery station to said delivery chute, said chute including a pair of opposed, travelling, endless conveyors, means mounting said conveyors in said chute to receive articles in said guide means therebetween, means for travelling said conveyors to positively travel articles received therebetween toward said discharge station, a gate, and means mounting said gate adjacent said conveyors for movement therebetween into the path of travel of articles travelled by said conveyor, said gate interrupting said suction means as an article is moved therepast, effecting the continuous flow of articles from said conveyors to said discharge station.

5. The invention as defined in claim 4 wherein the entry section of said suction means is connected to upper portion of said chute and wherein said chute includes support plates for the laps of said conveyors, said plates and said conveyors being provided with openings to admit suction therepast and into said guide means.

6. The invention as defined in claim 5 wherein one of said conveyors and its associated support plate is adapted for movement relative to the other of said conveyors and support plates to accommodate said chute for delivering articles of varying thicknesses.

7. A cigarette package conveying system for transferring packages from a packaging machine discharge station to a cartoning machine delivery station remote therefrom comprising conveyor tubing, means mounting one end of said conveyor tubing adjacent said packaging machine discharge station and the other end of said conveyor tubing adjacent said cartoning machine delivery station, a delivery chute, means operatively connecting each end of said delivery chute with said tubing adjacent said cartoning machine delivery station, suction means, means connecting said suction means to the upper portion of said delivery chute for effecting the pneumatic transfer of packages in said tubing from said packaging machine discharge station to said cartoning machine delivery station, said chute including a pair of opposed, endless, travelling belts, means mounting said belts in spaced relationship for receiving packages in said tubing and conveying them toward said cartoning machine delivery station, means for travelling said belts to conduct packages through said chute, a support plate for each belt, means mounting said support plate adjacent the opposed lap of its associated belt, said belts having perforations therein and said plates having apertures therein adjacent the suction chute entry, said perforations and apertures admitting suction into said system, a gate, and means pivotally mounting said gate on said chute below said plate apertures for movement out of position between said belts, said gate being constructed and arranged to be pivoted into operative position between said belts by suction after a package has been moved therepast by said belts, said gate interrupting the suction force in the lower portion of said chute to ensure positive discharge of package out of said system.

8. The invention as defined in claim 7 including beveled sections on each of said plates adjacent the upper portion thereof whereby said plates and associated belts form a tapered entry for packages into said delivery chute, preventing damage to said packages or contents.

9. The invention as defined in claim 7 including adjustable means for varying the tension in each of said belts.

10. The invention as defined in claim 7 including means for moving one of said belts and its associated support plate relative to the other of said belts and plate to accommodate said chute for handling package of varying thicknesses.

11. The invention as defined in claim 7 including means for adjusting the position of said gate relative to said belts and a package guide, means mounting said guide adjacent the junction of said tubing and the entry end of said chute, and means for adjusting the position of said guide in said chute, said gate adjusting means and said guide adjusting means adapting said chute to accommodate packages of varying widths.

12. The invention as defined in claim 7 wherein said gate is mounted in an aperture in the front of said chute and including a cover plate and means adjustably mounting said cover plate to the front of said chute for sliding movement relative thereto such that all or a portion of said apertures in the front of said chute may be closed, whereby, by leaving a portion of said aperture uncovered, said cover plate assists said gate in interrupting the suction force in the lower portion of said chute.

13. The invention as defined in claim 7 including control means for interrupting the entry of packages from said packaging machine discharge station into said conveyor tubing, said control means including a switch mounted adjacent the discharge end of said delivery chute, a solenoid, a gate connected to said solenoid and mounted for movement into and out of said conveyor tubing adjacent the packaging machine discharge station, an operating circuit connecting said switch and said solenoid whereby, when said switch is actuated by the accumulation of packages at said cartoning machine delivery station, said solenoid is energized to move said gate into position preventing the entry of said packages into said tubing at said packaging machine delivery station, and means normally urging said gate out of said tubing to freely admit packages thereinto.

14. The invention as defined in claim 7 wherein the outer members of said chute are constructed of transparent material to provide for visual inspection of the inside portion of said chute.

15. A delivery chute for use in a pneumatic article conveying system comprising top, bottom, side, front and rear frame members, said top and bottom frame members provided with openings operatively connecting said chute into said system, a pair of opposed travelling endless conveyors, means mounting said endless conveyors in spaced relationship for receiving articles therebetween conveyed thereto through said system and delivering them toward an article discharge station, means for travelling said endless conveyors to conduct said articles through said chute, a support member for each of said endless conveyors, means mounting said support member adjacent the opposed lap of its associated endless conveyor, a gate, means movably mounting said gate on said chute, said gate normally being maintained out of position between said belts, said gate being constructed and arranged to move into operative position between said belts by the pneumatic force acting in said system after an article has been moved therepast by said belt, said gate interrupting the pneumatic force acting on the articles conveyed therepast to insure positive discharge thereof out of said chute.

16. A delivery chute for use in a pneumatic package conveying system comprising top, bottom, side, front and rear frame members, said top and bottom frame members provided with openings operatively connecting said chute into said system, said rear frame member provided with an entry in the upper portion of said chute for admitting the pneumatic force into said chute, a pair of opposed travelling belts, means mounting said belts in spaced relationship for receiving packages therebetween conveyed thereto through said system and delivering them toward a package discharge station, means for travelling said belt to conduit said packages therebetween to said chute, a support plate for each of said belts, means mounting said support plate adjacent the opposed lap of its associated belt, said belts having perforations therein and said plates having apertures therein adjacent the pneumatic entry into said chute, said perforation and apertures admitting said pneumatic force from said chute into said system, a gate, and means pivotally mounting said gate on said front frame member below said pneumatic entry for movement out of position between said belts, said gate being constructed and arranged to be pivoted into operative position between said belts by said pneumatic force after a package has been moved therepast by said belts, said gate interrupting the pneumatic force acting a package conveyed therepast to insure continuous positive discharge of packages out of said chute.

17. The invention as defined in claim 16 including beveled sections on each of said plates adjacent the upper portion thereof whereby said plates and associated belts form a tapered entry for packages into said delivery chute, preventing damage to said packages or contents.

18. The invention as defined in claim 16 including means for moving one of said belts and its associated support plate relative to the other of said belts and plates to accommodate said chute for handling packages of varying thicknesses.

19. The invention as defined in claim 16 wherein said gate is mounted in an aperture in the front frame member of said chute and including means for adjusting the position of said gate relative to said belts, a package guide, means mounting said guide in the opening in said top frame member, means for adjusting the position of said guide in said chute, said gate adjusting means and said guide adjusting means adapting said chute to accommodate packages of varying widths, a cover plate, and means adjustably mounting said cover plate to said front frame member for sliding movement relative thereto such that all or a portion only of said aperture and said front frame member may be closed whereby, by leaving a portion of said aperture uncovered, said cover plate assists said gate in interrupting said pneumatic force.

References Cited in the file of this patent
UNITED STATES PATENTS
2,761,633 Sindzinski _____ Sept. 4, 1956